April 7, 1942.   C. T. LANGMAID   2,278,790
FASTENING DEVICE
Filed Dec. 6, 1940

INVENTOR.
Charles T. Langmaid
BY Edward M. Apple
Atty.

Patented Apr. 7, 1942

2,278,790

UNITED STATES PATENT OFFICE 2,278,790

FASTENING DEVICE

Charles T. Langmaid, Detroit, Mich.

Application December 6, 1940, Serial No. 368,762

1 Claim. (Cl. 85—32)

This invention relates to fastening devices and particularly to devices in which a threaded element, such as a nut, must be held in predetermined position on another member, so that a bolt may be quickly inserted.

Devices of this character have wide application in the automobile industry and elsewhere, where it is necessary to fasten together various parts in the final assembly of devices such as automobile bodies, metal cabinets, door locks and the like. This device, for example, permits nuts to be attached to body panels after the panels have been painted, thereby eliminating the difficulties that would be encountered if the threads of the nut were filled with paint before the bolts were inserted.

An object of the invention is to generally improve devices of this kind and to particularly take advantage of the benefits derived in employing clinch-on nuts such as described in Patent No. 2,110,039, in combination with holding clips, such as illustrated and described in this application.

Another object of the invention is to provide a combination and arrangement which has a substantial locking area for the clip before the bolt is inserted in the nut.

Another object of the invention is the provision of a fastening device of the character referred to, which has a greatly increased thread area, and increased strength by virtue of the backing provided by the flange of the nut.

The foregoing and other objects and advantages of the invention will appear more fully as the description proceeds, reference being made from time to time to the accompanying drawing forming part of this disclosure, in which drawing:

Fig. 1 is a perspective view illustrating the manner in which my improved fastening device is employed. In this view the clip holding the nut is at the left. The fragmentary piece in the center is the member to which the nut is to be attached and the fragmentary piece to the right is the piece to be secured to the member in the center.

Figure 5:
Figure 6:
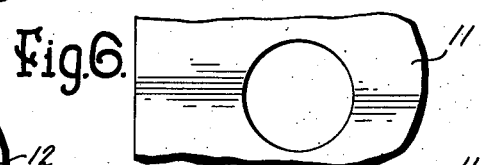
Figure 7:
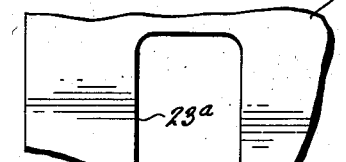

Figs. 5, 6, and 7 are fragments of clip supporting members having modified forms of apertures therein.

Figure 8:
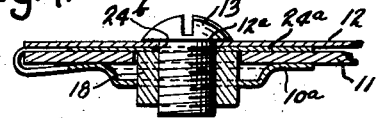

Fig. 8 is a sectional view illustrating a modified form of clip in which the bent-over portion is as long as the body portion and is provided with a bolt hole.

Figure 1:
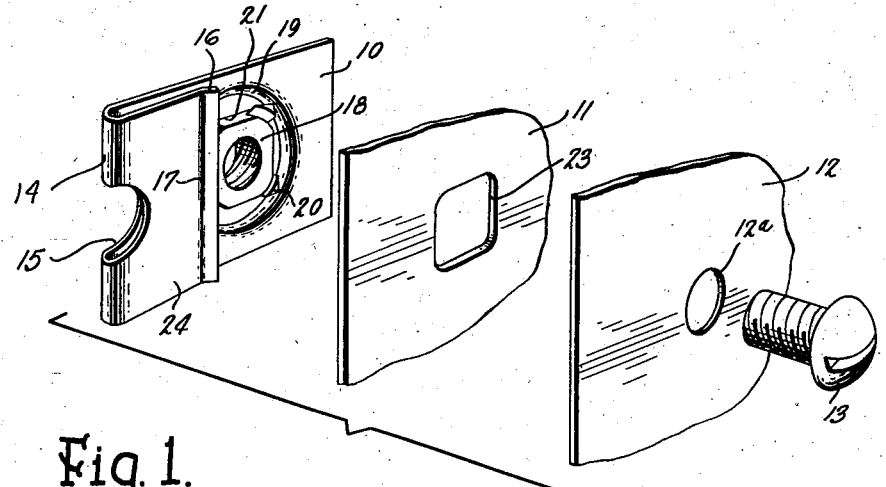

Referring now more particularly to the drawing (Fig. 1) it will be understood that the reference character 10 designates my improved clip, 11 designates an apertured panel to which the clip is intended to be attached and 12 is a member which is to be attached to the panel 11 by means of the bolt 13.

As previously stated, my improved fastening means enables a manufacturer to attach certain parts together in the final assembly of automobile bodies and the like. This permits the panels and the members to be attached thereto to be finished or painted, and then assembled without disturbing the finish of either, and without having the threaded area of the nut filled with paint or other substances which would make it difficult to insert the bolt.

My improved fastening device 10 consists of a strip of spring steel which is bent, as at 14, to form a clip. The strip is preferably perforated, as at 15, before it is bent, so that it can be more easily bent into the shape shown in Fig. 1. The end 16 of the bent portion is re-bent, as at 17, so that the clip can be more easily positioned over the end of a plate or other member, such as 11, to which it is desired to attach a nut, such as 18, so that another member, such as 12, may be secured thereto by means of the bolt 13.

Figure 2:
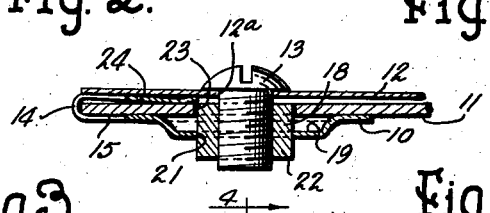
Fig. 2 is a section taken substantially on the line 2—2 of Fig. 3.
Figure 3:
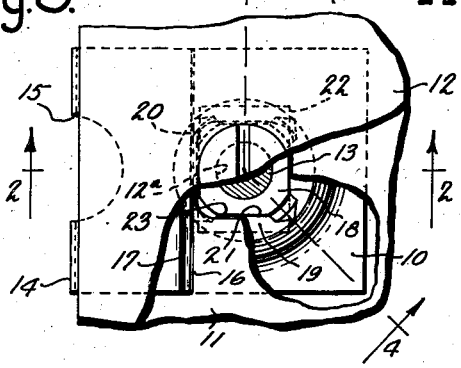
Fig. 3 is a plan view, with parts broken away, showing how the parts illustrated in Fig. 1 are finally assembled.
Figure 4:
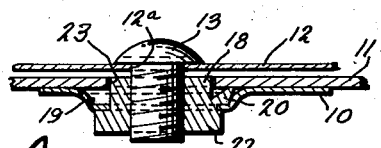
Fig. 4 is a section taken substantially on the line 4—4 of Fig. 3.

The clip 10 may be formed with a cup-like depression 19, which provides clearance for the clinched-over portions 20 of the nut. In the embodiment disclosed in Figs. 1 to 4 inclusive, the bottom of the cup 19 is provided with an aperture 21 through which the body portion of the nut 18 is inserted. The nut 18 is held in the aperture 21 by means of the flange 22 (Fig. 4) and the clinched-over portions 20. It will be noted that the body of the nut 18 protrudes beyond the upper surface of the clip 10 and into the aperture 23 of the panel 11. This provides a means whereby the clip is locked in position when it is placed over the edge of the panel 11 (Fig. 2). The spring tension in the bent-over portion 24 of the clip (Fig. 2) retains the nut 18 in the aperture 23 of the panel 11 so that the clip and the nut are held in predetermined position on the panel 11.

In assemblying parts by means of my improved fastening device, the clip 10 is placed over the edge of the panel 11 so that the edge of the panel 11 rests on the inside of the bend 14, and so that the nut 18 snaps into the aperture 23 of the panel 11 under the influence of the spring tension of the bent-over portion 24. The rebent end 16 of the clip 10 enables the operator to approach the panel 11 with the clip 10 positioned at an angle so that the protruding portion of the nut 18 is cleared by the edge of the panel 11, thereby facilitating the speed with which the clips are attached.

When the clip has been positioned on the panel 11 so that the nut 18 is in engagement with the aperture 23 of the panel 11, the operator is then ready to attach the member 12, which is done by inserting the bolt 13 through the bolt hole 12a and into the threaded portion of the nut 18.

In some applications, it is desirable to have the nut 18 adjustable on the panel 11 for purposes of alignment. In such applications, I prefer to make the aperture in the form of a slot 23a (Fig. 7). In Figs. 5 and 6, I show other modified forms of apertures which may be utilized in the panel 11.

In Fig. 8 I illustrate a modified form of clip 10a, in which the bent-over portion 24a is of the same length as the body portion of the clip. In this embodiment the edge of the bent-over portion 24a is straight, and the bent-over portion 24a is provided with a bolt hole 24b through which the bolt 13 can be inserted into the nut 18.

It will be seen from the foregoing description that I have provided a novel means for quickly locating a threaded member on a panel 11, which will provide a fastening device of great strength and adaptability.

Having described my invention, what I claim and desire to secure by Letters Patent is:

The combination with an apertured panel, of a fastening device comprising a strip of spring metal bent to form a clip, an aperture in said clip, and a clinch-on nut secured in said last named aperture, the said clip being positioned over the edge of the said panel so that the sides of the clinch-on nut engage the sides of the aperture of the panel to effect a locking arrangement, said clip having sufficient spring tension to permit its arms to be spread, so that the assembled clip may be slid over the edge of the panel, and the nut may be snapped into the panel aperture, to effect assembly with the said panel.

CHARLES T. LANGMAID.